United States Patent [19]
Beckman et al.

[11] 3,728,801
[45] Apr. 24, 1973

[54] AUDIO-VISUAL TEACHING UNIT

[76] Inventors: Richard K. Beckman, Route 3, Eau Claire, Wis. 54701; Burton H. Spangler, 307 Dodge St., Eau Claire, Wis. 54701

[22] Filed: Nov. 8, 1971

[21] Appl. No.: 196,690

[52] U.S. Cl. .......................... 35/60, 312/196, 353/78
[51] Int. Cl. .............................................. G03b 21/28
[58] Field of Search ..................... 35/35 C, 60, 8 A; 312/195, 196, 223; 353/18, 74, 75, 77, 78

[56] References Cited

UNITED STATES PATENTS

| | | | |
|---|---|---|---|
| 2,022,902 | 12/1935 | Thomas | 353/18 X |
| 3,204,521 | 9/1965 | Panzer | 353/78 X |
| 3,477,783 | 11/1969 | McCasland | 353/78 |

*Primary Examiner*—Harland S. Skogquist
*Attorney*—Herman H. Bains et al.

[57] ABSTRACT

An individual study facility incorporating a projector and a tape player fully enclosed within a cabinet structure made up of modular subassemblies including a portable, readily removable optical module or chassis on which the projector and associated mirrors are supported and a removable, hingedly mounted front panel assembly on which a rear projection viewing screen and the tape player are mounted. The front panel has an access opening at one end thereof directly in front of the projector for loading slides, and a slidable door normally covering the projector access opening is movable to an open position wherein it blocks the viewing screen on the other end of the front panel to preclude use of the projector and visual aids until the projector access door has been closed.

12 Claims, 4 Drawing Figures

Patented April 24, 1973

INVENTORS
Richard K. Beckman,
BY Burton H. Spangler
Williamson, Bains
& Moore ATTORNEYS

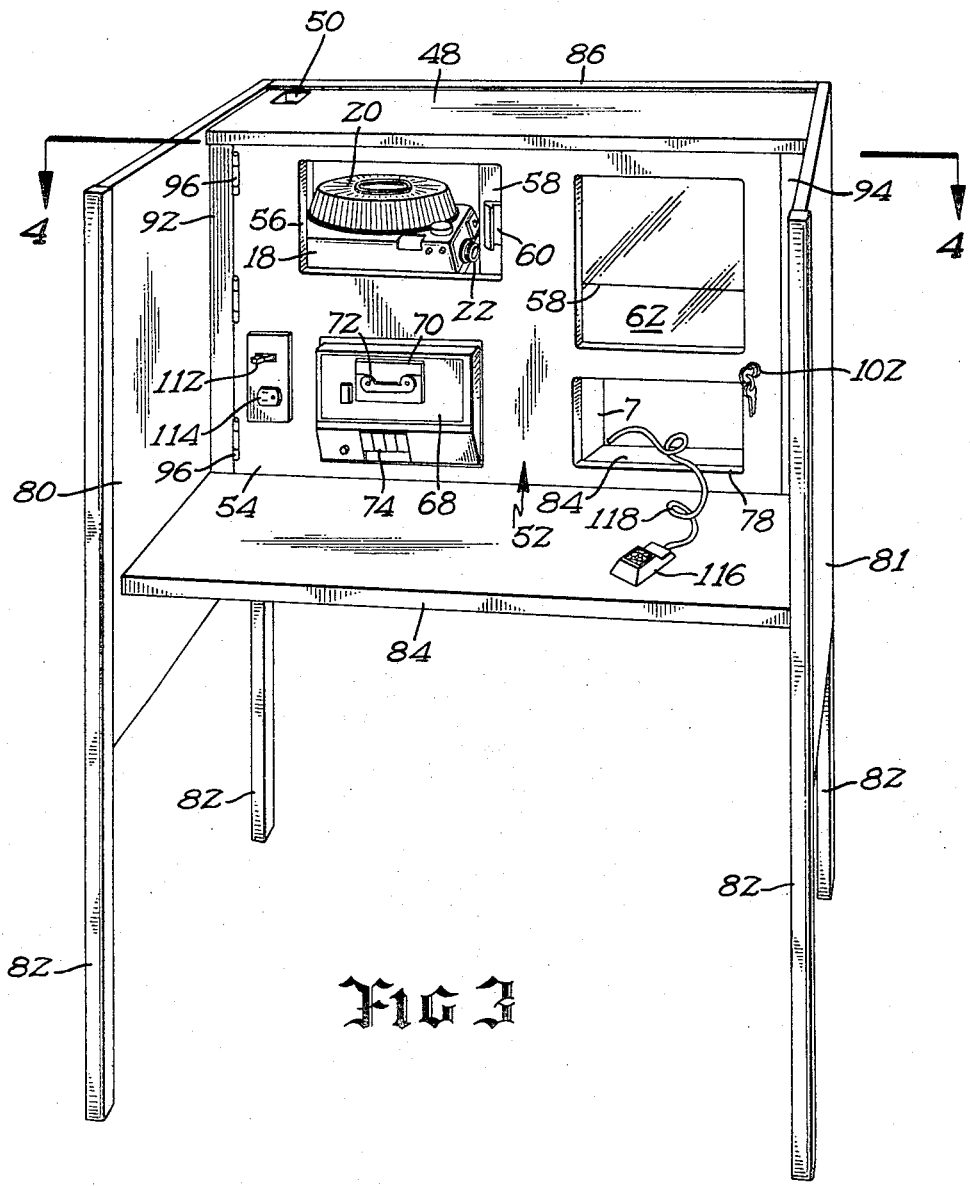

3,728,801

AUDIO-VISUAL TEACHING UNIT

BRIEF SUMMARY OF THE INVENTION

This invention is directed to an individualized study console or assembly containing a projector, viewing screen, and a tape player fully enclosed to insure quiet operation, security and neat, non-distracting appearance, these components being arranged in predetermined operating positions with respect to each other on modular subassemblies which can be easily and quickly assembled in various types of cabinet structures to meet particular study carrel requirements.

These basic objectives are realized by utilizing a modular construction incorporating a removable front panel subassembly to form the front wall of a cabinet structure, this subassembly including as integral components thereof a rear projection viewing screen and a tape player. A second subassembly in the form of an optical module includes a projector supported on a portable chassis at a predetermined location thereon in combination with a mirror system to permit projecting picture images onto said viewing screen when the portable projector chassis or optical module is freely positioned within a cabinet structure behind the front panel subassembly. These projection and audio modules are adapted to be selectively assembled as parts of a fully self-contained, portable, table top console or as parts of a study carrel whose end and back wall and table top serve as the enclosing walls for the projection and audio modules in combination with the modular front panel subassembly.

The aforesaid front panel subassembly is preferably hingedly attached to the cabinet structure, and is normally locked in a closed position. The front panel can be swung to an open position about the vertical axis defined by its hinge connection to permit access to the interior of the cabinet structure, and to the projector and tape player.

A further beneficial aspect of the study console structure resides in the provision of a projector access opening at one end of the front panel in horizontal alignment with the projector, to avoid having to open the front panel for loading the projector. This projector access opening is normally closed by a door member movable to an open position wherein it overlies and blocks at least a portion of the adjacent viewing screen located on the opposite end of the front panel subassembly. By virtue of this arrangement of the access opening and viewing screen on the front panel subassembly, the door for the projector access opening must be closed before picture images from the projector can be seen on the viewing screen, thereby insuring that the projector will be removed from view and contained behind a fully closed door and front panel structure with its noise dampened when the study assembly is in use.

The depth of the study assembly is advantageously minimized by positioning a slide projector on the projector chassis so that its front wall and image beam extend parallel to the plane of the front panel in which the rear projection viewing screen is mounted, and by using a plurality of mirrors permanently attached to the portable projector chassis to direct picture images from the projector onto the viewing screen.

These and other objects and advantages of our invention will become readily apparent as the following description is read in conjunction with the accompanying drawings wherein like reference numerals have been used to designate like elements throughout the several views.

BRIEF DESCRIPTION OF THE DRAWINGS

FIG. 3 is a front, perspective view of the audio-visual study assembly and study carrel structure of FIG. 2 with the front panel subassembly closed; and FIG. 4 is a horizontal section view taken along lines 4—4 of FIG. 3.

DESCRIPTION OF THE PREFERRED EMBODIMENTS

Figure 1:
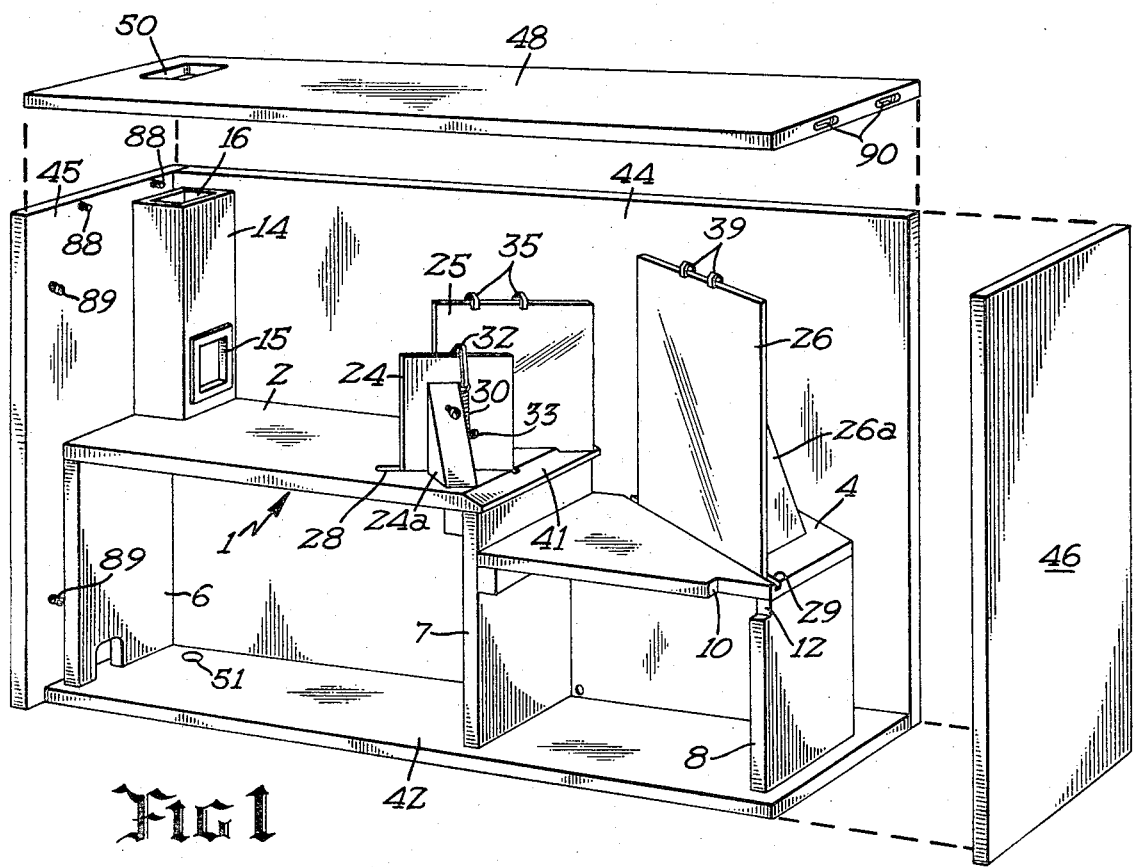
FIG. 1 is a front, perspective view of the projector chassis of this invention and associated cabinet structure.

Referring now to the drawings, we have shown in FIG. 1 the portable chassis 1 which serves as a projector subassembly, in which may be removably installed in various types of cabinet structures, one of which is illustrated in FIG. 1. The portable projector chassis is comprised of a projector deck or platform 2 and a secondary, mirror deck 4 supported on three vertical legs 6, 7 and 8. Platform 4 and end leg 8 are notched as is illustrated at 10 and 12 respectively in order to accommodate a lock of a front panel assembly hereinafter described. At the left rear of projector deck 2 is a vent stack 14 having an air inlet 15 and an air outlet 16. Vent stack 14 is located at a predetermined position on deck 2 wherein its inlet opening 15 will be in direct, fluid flow communication with a hot air exhaust passage of a projector 18, shown in position on deck 2 in FIGS. 2 through 4, for exhausting air from a conventional projector cooling fan utilized to cool projector 18. Although various types of projectors, including slide and movie projectors, might be utilized in our audio-visual study unit, we have found that a slide projector of the type shown in FIG. 2 having a circular slide cartridge 20, and front lens 22 is suitable and desirable for a wide variety of study applications.

Also mounted on the projector chassis 1, in a permanent, predetermined orientation with respect to each other are a plurality of reflective mirrors 24, 25 and 26. These mirrors are utilized in a manner hereinafter explained to reflect the image beam from projector 18 onto a rear projection, front viewing screen permanently mounted in a front panel subassembly. Mirrors 24, 25 and 26 are seated in slots formed in decks 2 and 4, as is indicated with respect to slots 28 and 29 for mirrors 24 and 26. Each of the mirrors is permanently supported in the predetermined positions shown in FIG. 1 by support blocks 24a, 25a, and 26a. Mirror 24 is held in place in an upright position against block 24a by a spring holder 30 having a hooked retention finger 32 attached to one end thereof which is engaged over the upper edge of mirror 24. The bottom end of spring 30 is permanently held in place on a pin 33 extending into support block 24a. The arrangement of mirrors 24, 25 and 26, and their support structures may clearly be understood by reference to FIG. 4 as well as to FIG. 1. Mirrors 25 and 26 are likewise supported on their respective blocks 25a and 26a by an assembly of spring holders, retention fingers and block mounting pins 34, 35, 36 and 38, 39, 40 respectively. It is to be noted with respect to FIG. 1, that the side edge of projector deck 2 adjacent to mirror deck 4 is beveled at 41. This is done to permit unobstructed beam projection from intermediate size mirror 25 downwardly onto the largest mirror 26 in the manner illustrated in dotted lines in FIG. 2. Mirrors 24, 25 and 26 are of increasingly larger size to accommodate the normal, conical shaped projector beam, and to receive and convey picture images projected by the expanding beam at increasingly greater distances from projector lens 22. The final picture image is reflected from mirror 26 onto a front screen, as will be understood with reference to the description of the viewing screen and front panel subassembly disclosed in FIGS. 2 through 4.

Figure 2:
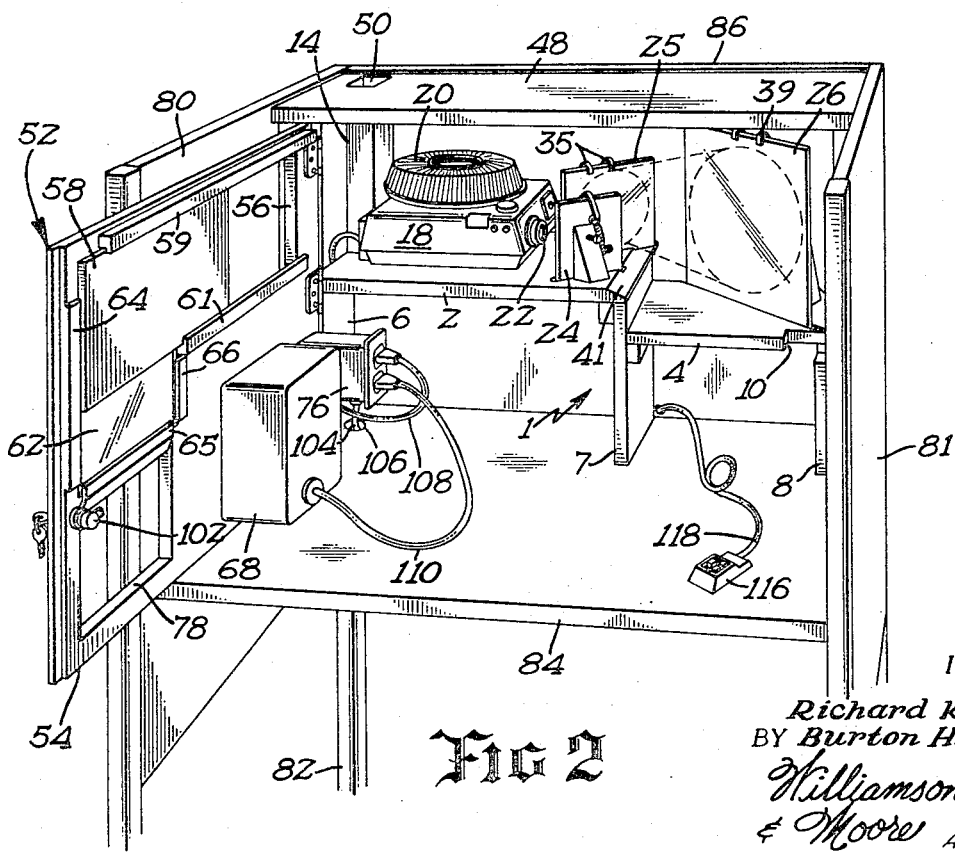
FIG. 2 is a front, perspective view of the audio-visual study assembly incorporated in a study carrel forming a portion of the cabinet structure, with the front panel subassembly open.

Chassis 1, together with image conveying mirrors 24, 25 and 26 form a portable, optical module on which projector 18 is supported at an elevated position in the manner shown in FIG. 2. This optical module subassembly may be freely and removably positioned within different types of cabinet structures, depending upon the requirements for particular study facilities. One cabinet structure in the nature of a portable, completely self-contained study console is illustrated in FIG. 1. Such a cabinet structure is formed by assembling a bottom wall 42, back wall 44, end walls 45 and 46, and a top wall panel 48 in enclosing relation to portable, optical module 1 in the manner shown in FIG. 1. A vent port 50 is formed in top panel 48 in position to be in direct, vertical alignment with outlet opening 16 in the top of vent stack 14, in order to exhaust hot air generated by the projector cooling fan from the interior of the cabinet structure. Top panel 48 is positioned between the upper edges of end panels 45 and 46, and is attached thereto by fasteners 88 received within slotted fittings 90 secured to the opposite, end edges of top panel 48. The cabinet housing for a portable, console type of study unit is completed by mounting a removable, front panel subassembly on the cabinet structure shown in FIG. 1 to provide a front wall.

The front panel subassembly includes as integral components thereof a viewing screen and a tape player, and may be selectively mounted on a portable console cabinet of the type illustrated in FIG. 1, or on a built-in study carrel type of cabinet structure as is illustrated in FIGS. 2 through 4. The structure of the front panel subassembly 52 and its manner of assembly to the end walls of a cabinet structure will now be explained with reference to the study carrel cabinet embodiment of FIGS. 2 through 4. In these FIGURES we have shown the manner in which the walls and table top of a study carrel may be used to form a portion of the cabinet structure for the study unit or assembly. Front panel subassembly or module 52 is comprised of a front panel 54 which has a projector access opening 56 at the left end thereof as viewed in FIG. 3, this opening being directly in front of, and in horizontal alignment with projector 18. Access opening 56 is normally closed by a slidably mounted door member 58 having a handle 60 thereon, slide door 58 being supported in guide runners 59 and 61 appearing in FIG. 2. On the opposite or right side of front panel 54, as viewed in FIG. 3, is a projector screen 62 positioned adjacent to projector access opening 56. Viewing screen 62 is a rear projection screen capable of receiving images projected onto it from projector 18 and mirrors 24, 25 and 26, the path of image projection being shown by the dotted lines in FIG. 4. Viewing screen 62 is permanently mounted on front panel 54 in the same vertical plane therewith, frame members 64, 65 and 66 on the inside of door panel 54 serving to support viewing screen 62 in the manner illustrated in FIG. 2.

Front panel subassembly 52 further includes as an integral part thereof a tape player 68, preferably of the cassette type having a tape deck 70 on which tape cartridges 72 may be removably inserted. Tape player 68 has a front facing control panel 74. Tape player 68 is advantageously mounted directly under projector access opening 56 so as to be receivable under elevated projector 18 in a compartment within the cabinet structure defined by projector deck 2 and side legs 6 and 7 of portable chassis 1 when front panel subassembly 52 is installed and closed in the manner shown in FIG. 3. This predetermined structural arrangement of portable projector chassis 1 with respect to front panel subassembly 52 and the location of tape player 68 not only provides a convenient, space saving means of housing the tape player within the cabinet enclosure but also avoids having the heat generated by projector 18 flow over the tape player, as would be the case if tape player 68 were positioned above projector 18. Also mounted on front panel subassembly 52 is a power supply junction box 76 from which power is supplied to tape player 68 and projector 18. Front panel subassembly 52 is completed by a second access opening 78 under viewing screen 62 through which articles, such as a headphone set may be placed within the cabinet structure under chassis deck 4 for storage.

The basic, study carrel structure within which the projector and audio modules 1 and 52 are installed in the embodiment of FIGS. 2 through 4 includes upright side walls 80, 81 supported on legs 82 and a table top or work desk 84 which abuts against an upright back wall 86. The identical cabinet top panel 48 illustrated in FIG. 1 is inserted and fastened between carrel side walls 80 and 81 in the same manner as described above with respect to the portable console type cabinet of FIG. 1. For this purpose, studs or fasteners 88 at the upper end of the carrel side panels 80 and 81 are received in locking engagement within slotted fixtures 90 provided in the end faces of top panel 48. For the purpose of removably mounting the front panel subassembly 52 in a position to serve as a front, closing wall for the cabinet structure, we utilize a pair of elongated mounting strips 92 and 94 which are quickly and easily installed in the upright position shown in FIGS. 3 and 4 against carrel side walls 80 and 81 utilizing a pair of mounting studs 89 at vertically spaced locations. A pair of such mounting studs 89 are shown in FIG. 1 attached to end walls 45, 46 of the portable console cabinet. Door mounting strips 92 and 94 are utilized in an identical manner in either the carrel type of cabinet structure shown in FIGS. 2 through 4 or in the portable console type of cabinet illustrated in FIG. 1. Slotted fittings 90 of the same type shown in top panel 48 in FIG. 1 are utilized on the outside edges of mounting strip 92 and 94 as a quick means for attachment to the heads of studs or fasteners 89, one of the studs 89 being shown in engagement with mounting strip 92 in FIG. 4. Mounting strip 92, and front door panel 54 are provided with mating hinge elements, which when assembled together in a manner shown in FIG. 3 provide vertically extending hinges 96 on which front panel 54 is removably mounted. Front panel 54 is normally locked in the closed position shown in FIG. 3 utilizing a lock 102. In its installed and closed position, front panel subassembly 52 thus serves as a front closure wall, in cooperation with carrel side or end walls 80, 81, table top 84 and back wall 86, as well as with the standard top panel 48 to form a complete housing which fully encloses projector 18 and tape player 68. It will be appreciated that before front panel subassembly 52 is installed, portable projector chassis or optical module 1 is freely and removably inserted within the cabinet wall structure 44, 45, 46 of FIG. 1, or 80, 81, 86 of FIGS. 2 through 4 with projector 18 positioned on deck 2 as shown. In order to maintain the portable projector chassis 1 snugly but removably in place within the cabinet structure, upright spacer blocks 98 and 100 are inserted at opposite ends of the cabinet structure between the cabinet end or side walls 80, 81 and the opposite ends of chassis 1, as illustrated in FIG. 4.

Power is supplied to junction box 76 by a main, power supply cord 104 which is extended upwardly through a hole 106 in the table top 84 of the study carrel, and cabinet structure. Projector power cord 108, as well as tape player supply cord 110 are plugged into junction box 76 in the manner shown in FIG. 2. On its front face, junction box 76 is provided with a projector control switch 112, as well as with an electrical outlet 114 which may be utilized for driving other electrical accessories such as a microscope light or a calculator. Projector control switch 112 and electrical outlet 114 are conveniently located on the front face of front panel assembly 52 for ready accessibility. For the purpose of tripping slides contained in the slide cartridge 20 of projector 18, a switch 116 is conveniently located on table top 84, with its power line 118 being connected to projector 18.

It will be appreciated that with front panel subassembly 52 fully installed and closed, as well as locked in place in a manner shown in FIG. 3, the projector and tape player units 18 and 68 are maintained with security in a fully enclosing cabinet structure which presents a neat appearance, and advantageously dampens the sound of both the projector and the tape player, as well as eliminating the visual distractions which would normally be caused by both of the projector and tape player units being in full view. The position of the tape player 68 places it within easy reach of the learner. The entire audio-visual study assembly purposely subdues the hardware, simplifies its operation and provides an environment conducive to study. It will be appreciated that lock 102 can be opened and that front door panel 54 can be swung to the open position shown in FIG. 2 in order to provide complete accessibility to the projector and optical components including mirrors 24, 25 and 26, as well as to the working mechanism of tape player 68. Tape player 68, being mounted on front panel subassembly 52, is swingable therewith to the open position of front panel 54 wherein it is completely accessible for servicing. In order to avoid the necessity of having to completely open front panel 54 for loading slides into projector 18, projector access door 58 is provided in access opening 56. As may be noted by reference to FIGS. 2 and 3, projector access door 58 is slidable to an open position in a direction extending from access opening 56 towards viewing screen 58. In its fully open position, access door 58 at least partially blocks viewing screen 62. By virtue of this arrangement, projector access door 58 must be returned to its closed position before picture images from projector 18 can be seen on viewing screen 62, thereby insuring that projector 18 is removed from view, and that the noise emitted by it when it is in operation is dampened when the study assembly is in use. Thus, a person using the audio-visual study assembly will not be distracted by the presence of the projector, or its noise.

It is to be noted, with reference to FIG. 4, that projector 18 is preferably installed on deck 2 in such a way that it is oriented square with the side and back walls 80 and 86 of the enclosing cabinet structure. This arrangement, as opposed to angling projector 18 within the cabinet assembly to direct its beam directly onto a viewing screen, saves space, and results in a cabinet structure of minimum depth. With projector 18 so oriented, its beam will extend in a direction parallel to the vertical plane of front panel 54 and to viewing screen 62 mounted therein. The particular arrangement of mirrors 24, 25 and 26, as illustrated in FIG. 4, permits the beam from the projector to be directed and conveyed onto the back face of rear projection screen 62 for front viewing.

Based on the foregoing description, it will be appreciated that the modular construction of our audio-visual study assembly or console utilizing projector chassis or optical module 1 with mirrors 24, 25 and 26 permanently installed thereon in a predetermined relation, and a separate, front panel subassembly 52 on which the viewing screen 62 and tape player 68 are permanently mounted permits the very quick and easy assembly of a complete audio-visual study assembly in the particular type of cabinet structure required for a study facility. The predetermined relationship of projector support deck 2 on chassis 1, projector access opening 56 and door 58, as well as the predetermined location of tape player 68 and viewing screen 62 on front door panel 54 insures that these various operating components will be located in the proper operating relation with respect to each other by simply removably inserting portable chassis 1 into a cabinet structure, and mounting front panel subassembly 52 on the hinge assemblies 96 as illustrated in FIG. 3. Because of this modular construction, a study carrel can be initially sold or built with or without the projection and audio modules. The customer or user can purchase a plain unequipped study carrel and, at a later date, as needs and/or budget dictate, he can add the projection-audio modules to the carrel without disassembly of or extensive modification to the carrel. The projection and audio modules 1 and 52 can be shipped in a knocked-down condition, and in most cases the user can assemble the unit himself with a minimum of tools.

We anticipate that various changes and modifications may be made to the size, shape, and structure of our audio-visual study components and assembly without departing from the spirit and scope of our invention as defined by the following claims.

We claim:
1. A fully enclosed, audio-visual study console comprising:
   a cabinet structure including end, front, back, top and bottom walls housing a projector and a tape player;
   a hingedly mounted front panel defining the front wall for said cabinet structure, said front panel being swingable outwardly to an open position permitting access to the interior of said cabinet structure and to said projector and tape player;
   a projector access opening at one end of said front panel in horizontal alignment with said projector;
   a rear projection, front viewing screen on the opposite end of said front panel; and
   image conveying means within said cabinet structure for directing picture images from said projector onto said screen.

2. An audio-visual study console as defined in claim 1 wherein:
   said tape player is mounted on said front panel and is swingable therewith to said front panel open position to permit servicing of said tape player.

3. An audio-visual study console as defined in claim 2 wherein:
   said projector is supported at an elevated position on a platform within said cabinet structure and said tape player is received within a compartment within said cabinet structure under said projector when said front panel is closed.

4. An audio-visual study console as defined in claim 1 wherein:
   said viewing screen is coplanar with the plane of said front panel, said projector is oriented to project an image beam parallel to the plane of said front panel, and said image conveying means includes a system of reflective mirrors arranged to reflect images from said projector onto said screen.

5. An audio-visual study console as defined in claim 1 wherein:
   said viewing screen is disposed in the vertical plane of said front panel;
   said image conveying means comprises at least one reflective mirror; and
   both said projector and said image conveying means are supported on a portable chassis freely movable into and out of said cabinet structure.

6. An audio-visual study console as defined in claim 1 wherein:
   said projector access opening in said front panel is normally closed by a door member movable to an open position wherein it overlies and blocks at least a portion of said viewing screen, whereby said door member must be closed, thereby removing said projector from view and dampening the noise emitted by said projector, before picture images from said projector can be seen on said screen.

7. An audio-visual study console as defined in claim 1, and further including:
   a vent stack for projector cooling air located at a rear corner of said cabinet structure, said vent stack having an air inlet communicating with a hot air exhaust passage of said projector and an air outlet communicating with a vent port in said top wall.

8. An audio-visual study assembly comprising:
   a projector and a tape player contained within a cabinet structure including an upright front panel;
   a projector access opening in said front panel in horizontal alignment with said projector;
   a viewing screen mounted on said front panel adjacent to said projector access openings;
   means for directing an image beam from said projector onto said screen; and
   a door on said front panel normally closing said projector access opening and movable to an open position in blocking relation to at least a portion of said screen, whereby said door must be closed before picture images from said projector can be seen on said screen, thereby removing said projector from view and dampening the noise emitted by said projector when said study assembly is in use.

9. An audio-visual study assembly as defined in claim 8 wherein:
   said projector access opening is at one end of said front panel, and said viewing screen is at the opposite end of said front panel; and
   said door normally closing said projector access opening is slidably mounted on said front panel for sliding movement in a direction from said one end of said front panel towards said opposite end thereof to said open position wherein it is disposed in blocking relation to said screen.

10. An audio-visual study assembly comprising:
    a projector and a tape player contained within a cabinet structure;
    a removable front panel subassembly defining the front wall of said cabinet structure, said tape player being mounted on said front panel subassembly so as to be movable therewith and receivable within a predetermined space of said cabinet structure when said front panel assembly is in place;
    a rear projection, front viewing screen mounted on said front panel subassembly for receiving and displaying picture images from said projector; and
    a portable chassis supporting said projector within said cabinet structure at a predetermined location and oriented relative to said front panel for projecting picture images onto said viewing screen, said portable chassis being freely movable into and out of said cabinet structure.

11. An audio-visual study assembly as defined in claim 10 wherein:
    said front panel subassembly is hingedly attached to said cabinet structure for swinging movement along a vertical, hinge axis to an open position permitting access to the interior of said cabinet structure.

12. An audio-visual study assembly as defined in claim 10, and further including:
    a power supply junction box for supplying power to said projector and said tape player mounted on said front panel subassembly.

* * * * *